US011574558B2

(12) United States Patent
Nam

(10) Patent No.: US 11,574,558 B2
(45) Date of Patent: Feb. 7, 2023

(54) GAME-BASED METHOD FOR DEVELOPING FOREIGN LANGUAGE VOCABULARY LEARNING APPLICATION

(71) Applicant: Allis Seungeun Nam, Seoul (KR)

(72) Inventor: Allis Seungeun Nam, Seoul (KR)

( * ) Notice: Subject to any disclaimer, the term of this patent is extended or adjusted under 35 U.S.C. 154(b) by 0 days.

(21) Appl. No.: 17/718,689

(22) Filed: Apr. 12, 2022

(65) Prior Publication Data

US 2022/0238039 A1 Jul. 28, 2022

Related U.S. Application Data

(63) Continuation of application No. PCT/KR2020/012541, filed on Sep. 17, 2020.

(30) Foreign Application Priority Data

Oct. 14, 2019 (KR) .................. 10-2019-0126593

(51) Int. Cl.
  *G09B 19/06* (2006.01)
  *G09B 19/22* (2006.01)
(52) U.S. Cl.
  CPC ............. *G09B 19/22* (2013.01); *G09B 19/06* (2013.01)
(58) Field of Classification Search
  CPC ................................ G09B 19/06; G09B 19/08
  See application file for complete search history.

(56) References Cited

U.S. PATENT DOCUMENTS

| 6,261,101 B1* | 7/2001 | Benitz | G09B 21/00 434/167 |
| 2004/0209231 A1* | 10/2004 | Merritt | G09B 17/00 434/156 |

(Continued)

FOREIGN PATENT DOCUMENTS

| JP | 2014-121416 A | 7/2014 |
| KR | 100769621 B1 | 10/2007 |

(Continued)

OTHER PUBLICATIONS

International Search Report of PCT/KR2020/012541 dated Apr. 5, 2021.

(Continued)

*Primary Examiner* — Kurt Fernstrom
(74) *Attorney, Agent, or Firm* — Dinsmore & Shohl LLP

(57) ABSTRACT

The present disclosure is technology providing a foreign language learning application through game contents through a user terminal (smart phone, tablet, PC, or the like), and provides a foreign language word and a meaning thereof based on a preset language provided in an application together. Therefore, it is possible to provide a foreign language learning effect in which the user becomes a subject and learns the foreign language word while actively participating in the game by increasing 'entertainment' and 'participation' rather than a passive method for learning to write and listen to foreign language alphabets, simply and repeatedly. In addition, it is possible to provide an application that maximizes the effect of learning by repeatedly providing a word that has been encountered once so as not to forget by providing repeated learning based on an Ebbinghaus forgetting curve.

13 Claims, 7 Drawing Sheets

(56) References Cited

U.S. PATENT DOCUMENTS

| | | | |
|---|---|---|---|
| 2007/0015121 A1* | 1/2007 | Johnson | G09B 7/02 434/156 |
| 2007/0048697 A1* | 3/2007 | Du | G09B 19/04 434/156 |
| 2009/0204398 A1* | 8/2009 | Du | G09B 5/04 704/E15.001 |
| 2010/0047748 A1* | 2/2010 | Hwang | G09B 5/04 434/157 |
| 2014/0272818 A1* | 9/2014 | Carrasquillo-Garcia | G09B 19/06 434/129 |
| 2017/0287356 A1* | 10/2017 | Stephen | G09B 7/06 |
| 2019/0122578 A1* | 4/2019 | Wasserman | G09B 19/06 |
| 2021/0319712 A1* | 10/2021 | Kim | G09B 19/06 |

FOREIGN PATENT DOCUMENTS

| | | |
|---|---|---|
| KR | 10-1160963 B1 | 7/2012 |
| KR | 10-2012-0132983 A | 12/2012 |
| KR | 10-2013-0098955 A | 9/2013 |
| KR | 10-2014-0096017 A | 8/2014 |

OTHER PUBLICATIONS

Preliminary Rejection of KR 10-2019-0126593 from Korean Intellectual Property Office dated May 25, 2021, pp. 1-16.

* cited by examiner

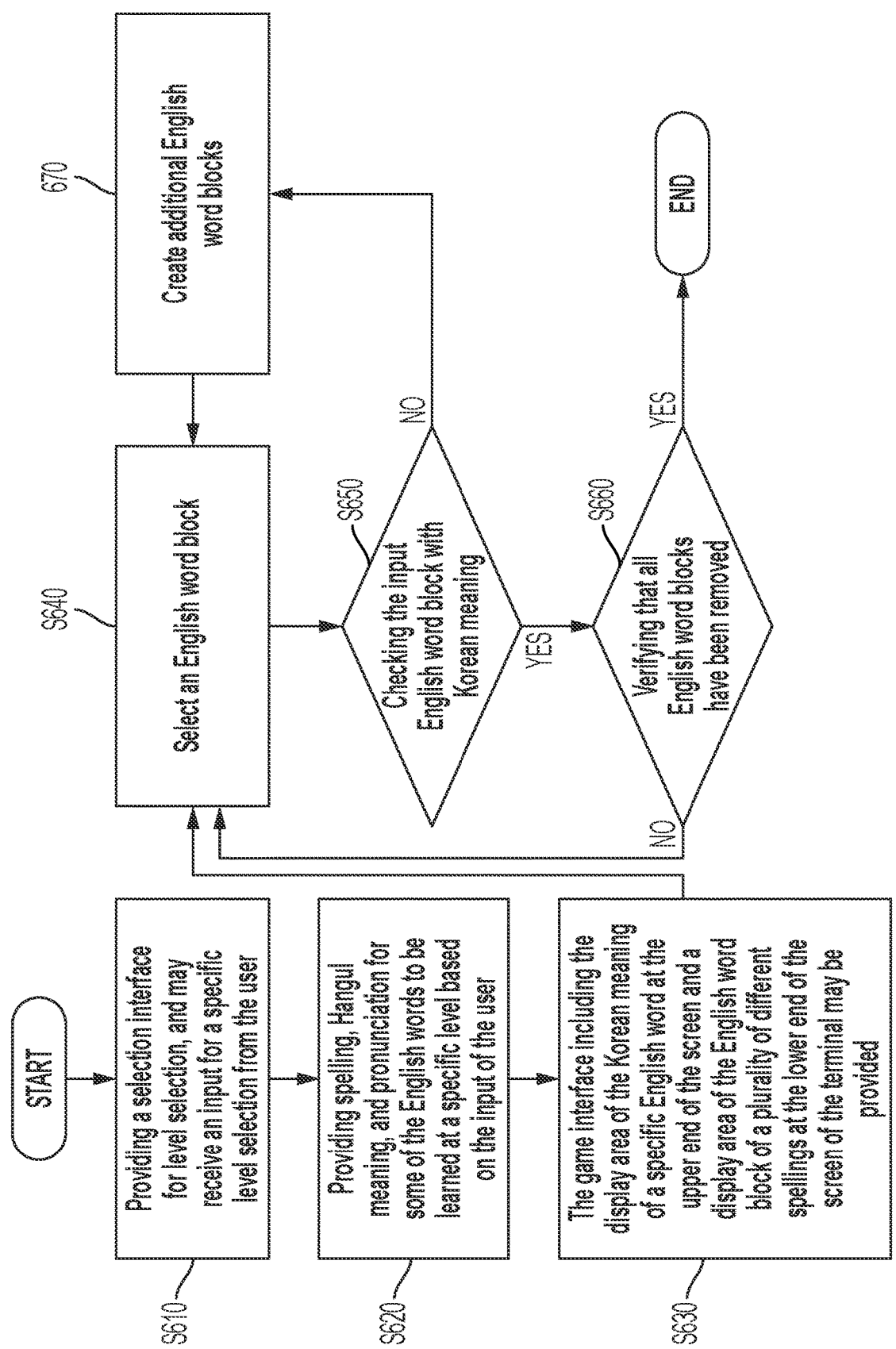

GAME-BASED METHOD FOR DEVELOPING FOREIGN LANGUAGE VOCABULARY LEARNING APPLICATION

CROSS-REFERENCE TO RELATED APPLICATIONS

The present application is a continuation of International Application No. PCT/KR2020/012541, filed on Sep. 17, 2020, which claims priority to Korean Patent Application No. 10-2019-0126593 filed on Oct. 14, 2019, which is incorporated herein by reference in its entirety.

BACKGROUND

1. Technical Held

The present disclosure relates to a game-based method for developing a foreign language vocabulary learning application, and more particularly, relates to a foreign language word learning application that completes a game progress and preferentially shows an example of learning of English words that have the most demand for learning by providing spelling and pronunciation of foreign language words to be learned at a specific level, and the meaning of a preset language provided by the application, and removing the corresponding foreign language words.

2. Related Art

With the development of science and technology, an educational environment also demands a new type of paradigm that combines technology and education in a digital age. Due to a social atmosphere, an economic growth, and an improvement of educational conditions, most children or adolescents prefer digitized videos rather than texts, are accustomed to machines such as computers, electronic dictionaries, and smart phones, and want to spend their leisure time using them. They not only increase the leisure time but also prefer entertainment rather than study.

In the educational method, the method for learning foreign language words through a conventional letter-form book is a method which is a hard and passive form while ignoring these desires. In addition, the existing language learning tools (computer, electronic dictionary, cassette tape, CD, video, MP3, and half-study) using audio or video media present example sentences of words, idioms, sentences, and the like. Therefore, because a user repeatedly listens the contents of the example sentences, or learns only repeatedly and passively according to instructions of a program, there is a disadvantage in that it makes the user feel a strong sense of study and lowers attention and interest in foreign languages, thereby lowering the learning efficiency.

In order to satisfy both 'play culture' and 'necessity of learning the foreign language', software development is absolutely necessary, which may implement a self-directed foreign language learning method that maximizes the learning effect by selecting and practicing a learning progress by taking the initiative in himself/herself of the user through motivation in learning while playing a three-dimensional functional game using a device having a multimedia video function.

Although there is a series of game-type contents in which foreign languages may be studied, there are too limited aspects because the entertainment is poor and the emphasis is on learning.

SUMMARY

The present disclosure is provided to solve the problems of the related art described above, and an object of the present disclosure is to provide user-centered game contents which are convinced that it is best to inspire students, who have reluctance to a foreign language, to naturally learn the foreign language by instilling attention and interest in the foreign language, and in which needs of a user may be thoroughly found in the future and those needs may be satisfied while increasing the learning effect at the same time.

In addition, another object of the present disclosure is to give the user interest in the game and to provide an effective repetitive learning tool so that the user may learn new words while naturally enjoying the game without making any special effort. In addition, further another object of the present disclosure is to provide global service by presenting foreign language words and meanings thereof based on a preset language provided by an application.

As technical means for achieving the above-described technical task, according to an embodiment of the present invention, there is provided a game-based method for developing a foreign language vocabulary learning application performed by a terminal, including: (a) a step of providing a game interface including a display area for a meaning of a word in a preset language in one area of a screen, and a display area for a plurality of foreign language words having different spellings in another area of the screen of the terminal; and (b) a step of determining whether a foreign language word corresponding to a selection input is a correct word matching the meaning of the word in the preset language, and then when they are matched, removing the foreign language word of the selection input, when the selection input for any one foreign language word among the plurality of foreign language words is received. The step (b) may further include a step of providing identification information indicating that they do not match when the foreign language word corresponding to the selection input does not match meaning of the word in the preset language, and additionally generating the correct word. When all or a specified number of the plurality of foreign language words are removed, the game progress may be completed.

Before the step (a), the method may further include a step of providing a selection interface for level selection and receiving a selection input for a specific level from the user; and providing spelling, meaning, and pronunciation for some of the foreign language words to be learned at the specific level.

In addition, the preset language may be any one of a preset language provided by an application, a language designated as a default value in the user terminal, and a language set through a direct input of the user.

In addition, the identification information may be any one or more of a predetermined sound and a predetermined video.

In addition, the method may further include (c) a step of presenting meaning of any one of remaining foreign language words that have not been removed other than the foreign language words removed in step (b) at an upper end of the screen.

Here, in step (c), meaning of a foreign language word different from the foreign language word removed in step (b) may be preferentially presented.

In this case, the selection input may include any one of a direct input, a drag input, a click input, and a touch input, and in a case of the drag input, and when the drag input for a preset range or more is received for the foreign language word, the drag input may be received as a normal selection input.

The foreign language word may be configured of one block for each alphabet, and when the drag input is received from the left to the right of the foreign language word, the selection input may be considered to be received even if the drag input is received from a block located in a predetermined order rather than the first block from the left.

In addition, before step (a), the method may further include (a-1) a step of including the one or more foreign language words included in a foreign language wordbook application in the foreign language words of the foreign language learning application when one or more foreign language words are input through the foreign language wordbook application linked to the foreign language word learning application.

In the step (a-1), one or more foreign language words included in the foreign language wordbook application may be a foreign language word which is received by direct input of the user, or a foreign language word which is uploaded by another user.

In addition, the one or more foreign language words may be repeatedly presented every preset cycle according to an Ebbinghaus forgetting curve when the game is progressed for another level of the foreign language word learning application even if the one or more foreign language words are removed according to the selection input.

The specific level may be configured of one or more stages that sequentially progress, and the one or more stages may include a first stage in which a foreign language word to be matched by the user as a correct answer is presented, a second stage configured of the foreign language word included in the first stage and an additional foreign language word, and a third stage which provides one or more foreign language words included in the second stage, and in which a time limit is set. The additional foreign language word may be one or more foreign language words that are the same as or different from the foreign language word presented in the first stage.

In addition, a server providing a game-based method for developing a foreign language vocabulary learning application, includes a memory in which a game-based foreign language learning application program is stored; and a processor for executing the program. According to the execution of the program, the processor may provide a game interface including a display area for a meaning of a word in a preset language in one area of a screen of the terminal and a display area for a plurality of foreign language words having different spellings in another area of the screen; remove a foreign language word which is selected and input after determining whether the foreign language word corresponding to the selection input is a correct word matching the meaning of the word in the preset language then when they are matched, when the selection input for any one foreign language word among the plurality of foreign language words is received; provide identification information indicating that the word does not match when a foreign language word corresponding to the selection input does not match meaning of the word in a preset language, and additionally generating a foreign language word block corresponding to the correct word; and complete the game progress when all or a specified number of the plurality of foreign language words are removed.

The present disclosure provides a foreign language learning application through game contents through a user terminal (smart phone, tablet, or the like), and provides a foreign language word and a meaning thereof based on a preset language to transmit the meaning of the foreign language word together. Therefore, it is possible to provide a self-directed learning effect in which the user becomes a subject and learns the foreign language word while actively participating in the game by increasing 'entertainment' and 'participation' rather than a passive method for learning to write and listen to foreign language alphabets, simply and repeatedly.

In addition, by providing repeated learning based on the Ebbinghaus forgetting curve, it is possible to provide an application that maximizes the effect of learning by repeatedly providing a word that has been encountered once so as not to forget.

In order to learn a new word, the learner has to encounter the word at most 17 times. The present disclosure allows the learner to learn the word in a variety of patterns according to the reaction of the user, and reflects the ability of the user to identify the correct answer in addition to the immersion of the game to perform continuously reviewing until it is determined that the words have been sufficiently learned. Therefore, it is possible to learn the word and the pronunciation thereof effectively and in a fun way.

BRIEF DESCRIPTION OF THE DRAWINGS

Various embodiments of the present disclosure will become more apparent in view of the attached drawings and accompanying detailed description, in which:

FIG. 7 is a flowchart for explaining a game-based method for developing a foreign language vocabulary learning application according to an embodiment of the present disclosure.

DETAILED DESCRIPTION

Figure 1:
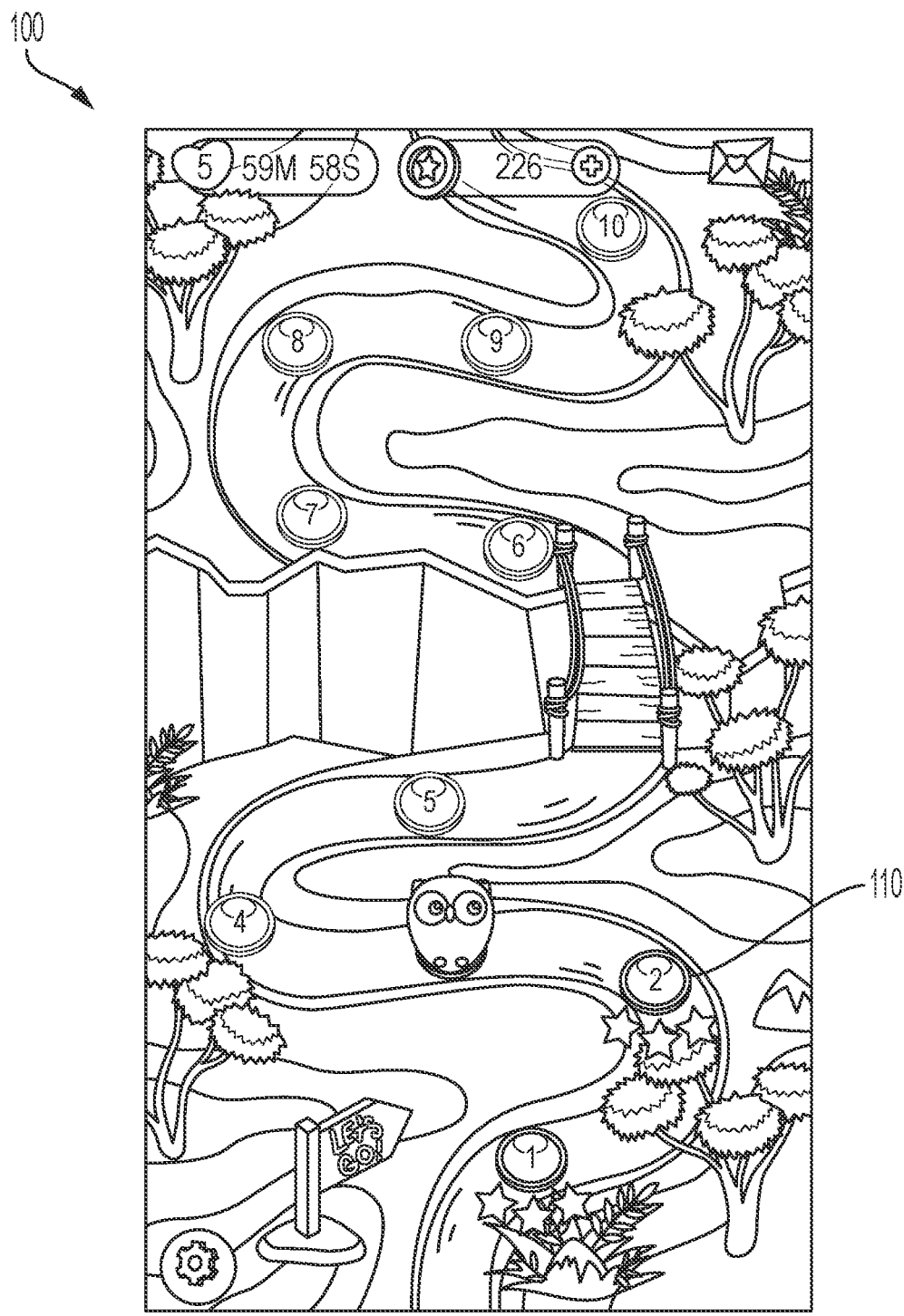
FIG. 1 is an exemplary view of a level selection interface of a game-based method for developing a foreign language vocabulary learning application according to an embodiment of the present disclosure.

Hereinafter, embodiments of the present disclosure will be described in detail with reference to the accompanying drawings so that those of ordinary skill in the art may easily implement them. However, the present disclosure may be embodied in several different forms and is not limited to the embodiments described herein. In addition, in order to clearly explain the present disclosure in the drawings, parts irrelevant to the description are omitted, and similar reference numerals are attached to similar parts throughout the specification.

Throughout the specification, when a part is "connected" with another part, this includes not only a case of being "directly connected" but also a case of being "electrically connected" with another element interposed therebetween. Also, when a part "includes" a configuration element, it means that other configuration elements may be further included, rather than excluding other configuration elements, unless otherwise stated.

In this specification, a "part" includes a unit realized by hardware, a unit realized by software, and a unit realized using both. In addition, one unit may be implemented by using two or more hardware, and two or more units may be implemented by one hardware. Meanwhile, '~ section' is not limited to software or hardware, and '~ section' may be configured to be in an addressable storage medium or may be configured to regenerate one or more processors. Accordingly, as an example, '~ section' indicates configuration elements such as software configuration elements, object-oriented software configuration elements, class configuration elements, and task configuration elements, and progresses, functions, properties, and procedures, subroutines, segments of program code, drivers, firmware, microcode, circuitry, data, databases, data structures, tables, arrays, and variables. The functions provided in the configuration elements and '~ sections' may be combined into a smaller number of configuration elements and '~ sections' or further separated into additional configuration elements and '~ sections'. In addition, configuration elements and '~ sections' may be implemented to regenerate one or more CPUs in a device or secure multimedia card.

The "terminal" referred to below may be implemented with a computer or portable terminal that may access a server or other terminal through a network. Here, the computer may include, for example, notebook, desktop, laptop, VR HMD (for example, HTC VIVE, Oculus Rift, GearVR, DayDream, PSVR, or the like) equipped with a WEB Browser, or the like. Here, VR HMD includes all Stand Alone models (for example, Deepon, PICO, or the like) which are Independently implemented from for PC (for example, HTC VIVE, Oculus Rift, FOVE, Deepon, or the like), for mobile (for example, GearVR, DayDream, Baofeng Mojing, Google Cardboard, or the like), and for console. A portable terminal is, for example, a wireless communication device that guarantees portability and mobility, and may include not only a smart phone, a tablet PC, a wearable device, but also various devices equipped with a communication module such as Bluetooth® (BLE, Bluetooth® Low Energy), NFC, RFID, ultrasonic, infrared, Wi-Fi, or Li-Fi. In addition, the "network" refers to a connection structure capable of exchanging information between respective nodes, such as terminals and servers, and includes a local area network (LAN), a wide area network (WAN), the Internet (WWW: World Wide Web), wired and wireless data networks, telephone networks, wired and wireless television networks, or the like. An example of the wireless data communication network includes 3G, 4G, 5G, 3rd Generation Partnership Project (3GPP), Long Term Evolution (LTE), World Interoperability for Microwave Access (WIMAX), Wi-Fi, Bluetooth® communication, infrared communication, ultrasound Communication, Visible Light Communication (VLC), LiFi, or the like, but is not limited thereto.

Hereinafter, a technology for performing a game-based method for developing a foreign language vocabulary learning application according to an embodiment of the present disclosure will be described in detail.

The foreign language learning application of an embodiment of the present disclosure is an application for learning a foreign language for a language mainly used by a user (any one of a preset language provided by the application, a language designated as a default value in a user terminal, and a language set through an direct input of the user), and may be applied to all foreign languages. However, in the following specification and drawings, for convenience, 'English' is designated as one of all foreign languages applicable to the foreign language learning application, and 'Korean (Hangul)' is designated as an example of a preset language provided by the application. However, an embodiment of the present disclosure is not construed as being limited to the categories of 'English' and 'Korean (Hangul)', and may be applied to a case where a foreign language and a preset language provided by the application are defined as other languages.

A terminal for providing a game-based method for developing an English vocabulary learning application may include a memory in which a game-based foreign language learning application program is stored and a processor for executing the program.

That is, the terminal may preferably be a smartphone, a tablet PC, a PC, or the like, and may be an electronic device in which the game-based English learning application is pre-stored.

According to the execution of the program, the processor of the terminal provides a selection interface for level selection, receives an input for a specific level selection from the user, provides spelling, Korean meaning, and pronunciation for some of the English words to be learned at a specific level, and provides a game interface including a display area of the Korean meaning of a specific English word at an upper end of a screen and a display area of an English word block 130 of a plurality of different spellings at a lower end of the screen of the terminal. In a case where the selection input for any one English word block of a plurality of English word blocks 130 is received, after it is determined that whether the English word block 130 corresponding to the selection input matches the Korean meaning of the presented English word, if they are matched, the English word block 130 that has been selected and input may be removed.

Meanwhile, the operations of the foreign language learning application to be described below may be performed in the terminal, but may be performed in the server and the terminal may serve only to display execution results of the server.

The functions provided through the above-described game interface will be described in detail later with reference to FIGS. 1 to 7.

In a case where all of a plurality of English word blocks 130 are removed, a game progress of a specific level may be completed.

Hereinafter, a selection interface according to an embodiment of the present disclosure will be described in detail with reference to FIG. 1.

FIG. 1 is an exemplary view of a selection interface 100, according to an embodiment of the present disclosure.

In the selection interface 100, a background screen is provided, each level 110 may be provided in a selectable state, and a character located in each level 110 may be provided in response to a selection input of the user in a predetermined form.

In a case where the game-based English learning application is first executed through the terminal, it starts at level 1, and in a case where the stage for each level 110 is completed, the next level 110 may be activated to be selected.

In addition, the level 110 that has been activated once may be activated so that reselection is possible at any time, unless initialized.

Figure 2:
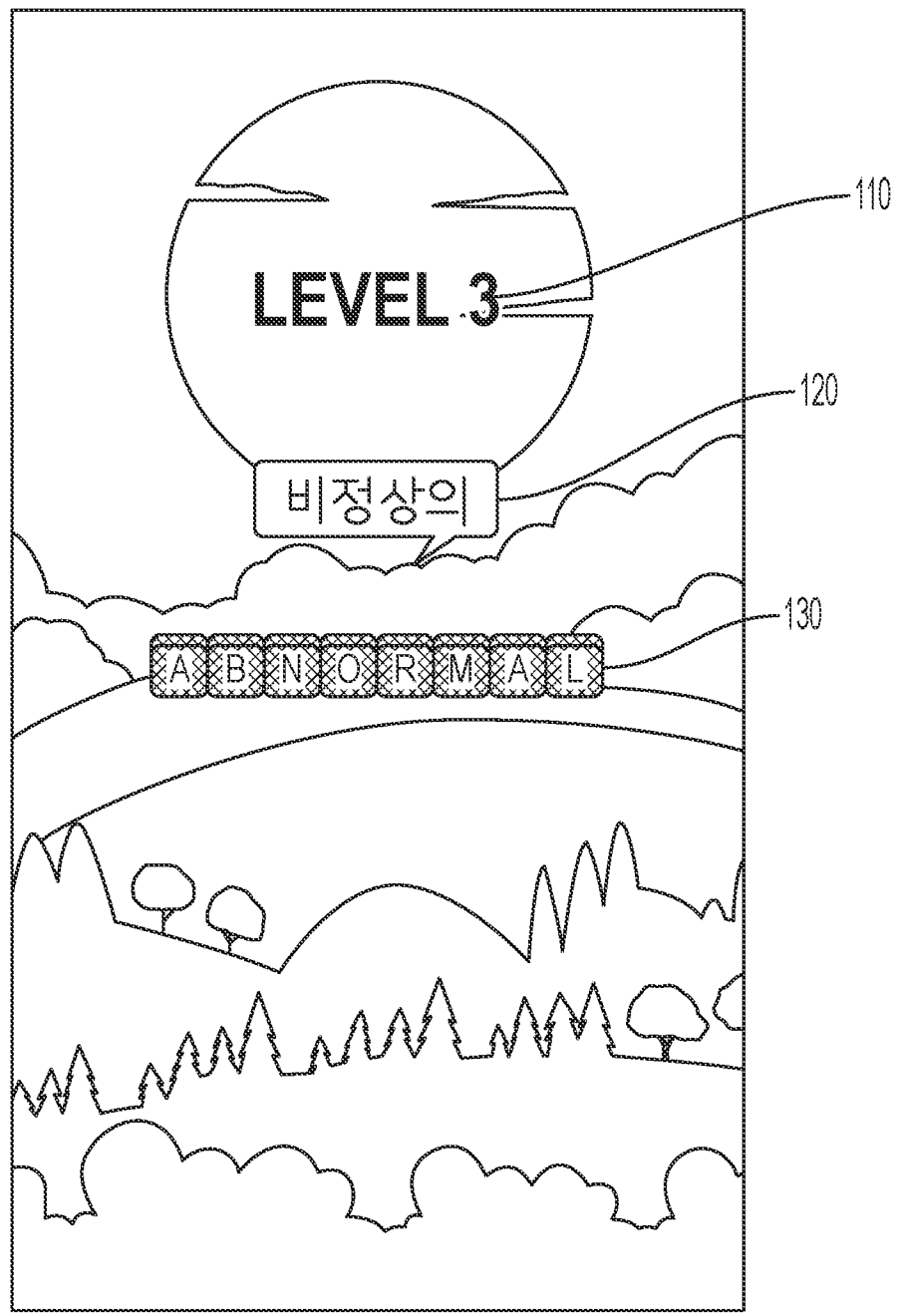
FIG. 2 is an exemplary view illustrating an interface that provides spelling of some of foreign language words to be learned at a specific level of a game-based method for developing a foreign language vocabulary learning application, the meaning of the foreign language words (meaning based on a preset language provided by an application) and pronunciation thereof, according to an embodiment of the present disclosure.

Each level 110 may be configured of one or more stages sequentially progressing, and may be configured of, as illustrated in FIG. 2, a first stage 210 which includes one or more English word blocks 130 including suggested English words, a second stage 220 which includes one or more English word blocks 130 included in the first stage and additional English word blocks 130, and a third stage 230 which provides the English word blocks 130 included in the second stage and timer 150, and in which a time limit is set.

However, it is obvious to those skilled in the art that each level is configured of the first to third stages only for explaining an embodiment of the present disclosure, and may be configured of one stage or a plurality of stages.

In addition, in a case where the game-based English learning application is re-executed, the character may be located in the next level 110 of the level 110 completed before re-execution or the level 110 that has not been completed, and may be activated to enable execution up to the level 110 at which the character is located.

Hereinafter, referring to FIG. 2, an interface will be described in detail, which provides spelling of some of the English words to be learned, and meaning and pronunciation of the foreign language words at a specific level of the game-based method for developing an English vocabulary learning application according to an embodiment of the present disclosure.

In the interface illustrated in FIG. 2, a specific word to be provided at the corresponding level 110 may be provided.

The currently selected level 110 may be displayed and provided, and the Korean meaning 120 of the provided English word and the English word block 130 may be provided. In the example below, the preset language provided by the application may be Korean.

The English word block 130 may be configured of a plurality of blocks in which the spelling constituting the corresponding word is each configured of one block, and in a case where a selection input to the English word block 130 is performed, the pronunciation for the English may be provided as a sound.

In this case, the selection input may preferably be a drag input, but may be various types of input such as a click, a touch, type-in, and a direct input.

As a further embodiment of the present disclosure, in a case where the selection input for the English word is received, it may be considered that the selection input is received even if the selection input is received for a part of the all blocks rather than the first block of the English word block 130.

For example, when the drag input is received from the left to the right of the English word block 130, even if the drag input is received from a block located in a predetermined order rather than the first block from the left, it may be considered as the selection input. Alternatively, even when the click or touch input is performed, even if only one block among all blocks receives the click or touch input, it may be considered that the selection input has been received.

In addition, as an additional embodiment of the present disclosure, an example sentence of a sentence including the English word block 130 may be provided.

The example sentence may be provided as any one or more contents of sound, text, and video. A button for providing the example sentence may be included in an interface providing spelling, Korean meaning, and pronunciation for some of the English words to be learned at a specific level, so as to be selectively provided.

Hereinafter, a game interface of the game-based method for developing an English vocabulary learning application according to an embodiment of the present disclosure will be described in detail with reference to FIGS. 3 to 5.

Figure 3:
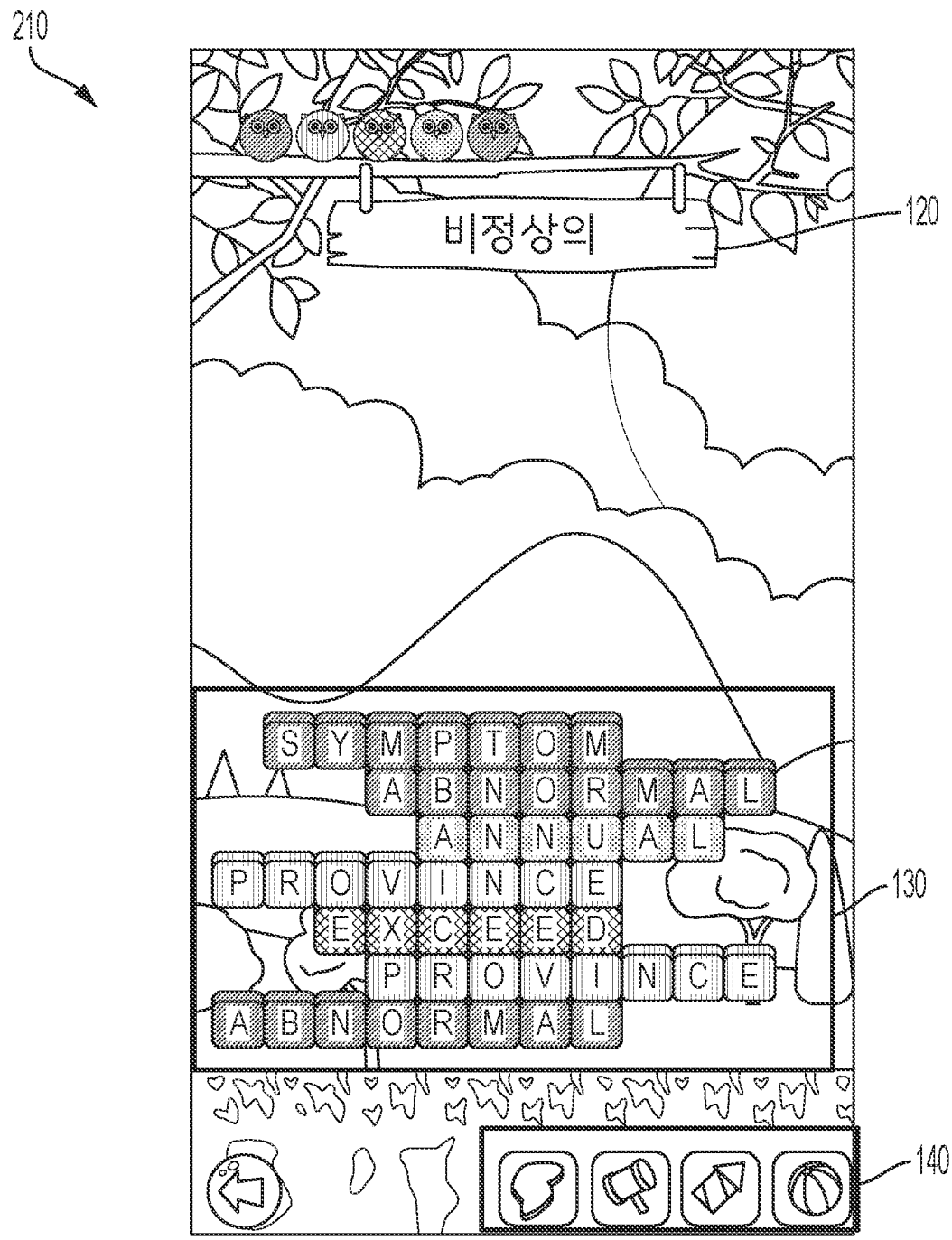
FIG. 3 is an exemplary view of a first stage of a game interface of a game-based method for developing a foreign language vocabulary learning application according to an embodiment of the present disclosure.

FIG. 3 is an exemplary view of the first stage 210 of the game interface of the game-based method for developing an English vocabulary learning application according to an embodiment of the present disclosure.

The first stage 210 of the game interface of the game-based method for developing an English vocabulary learning application may be provided to include an English word block 130 provided in an interface that provides spelling, Hangul meaning, and pronunciation for some of the English words to be learned at a specific level, and further include the English word block 130 that is provided at the previous level 110.

As illustrated in FIG. 3, the Korean meaning for the English word may be provided at the upper end (or one area) of the game interface, and a plurality of English word blocks 130 may be provided at the lower end (or another area). The English word blocks are initially presented while being stacked by a predetermined number, and the English word block may be removed every time the user gets the correct answer.

On the other hand, in a case where the English word blocks are stacked and come in contact with an upper end Maginot line, are stacked to a preset height or more, or are stacked to a preset number of blocks or more, the corresponding stage mission fails. In addition, as illustrated in FIG. 3, each English word block is randomly stacked, rather than stacked side by side according to a specific standard in a manner such as center alignment or left alignment.

At this time, since the English word blocks are randomly stacked, the operation convenience of the user may be promoted by changing starting positions of the English word blocks so that an adjacent block is not selected when a button is selected.

In a method for selecting the first starting word and performing the selection input through drag input on the spot for the rest, it is better to select the correct block by spacing the words left and right rather than a difference in the position of the first letter only up and down.

That is, the second PROVINCE from the bottom is configured to be stacked from a position corresponding to the 'O' block of the ABNORMAL at the bottom, and the fourth PROVINCE from the bottom is configured to be stacked from a position corresponding to the 'A' block. As such random presentations increase the difficulty by presenting a little confusion to the user, the user may solve the problem only when he/she clearly knows the learning of the spelling. In addition, the color of each block may also be presented randomly, but the same word may be expressed with the same color.

The game may be progressed in a form in which the user finds the English word block 130 corresponding to the Korean meaning of the English word block 130 provided at the upper end of the game interface among the plurality of English word blocks 130 and performs the selection input.

In this case, in a case where the selection input is normally received for the English word block 130 corresponding to the Korean meaning of the English word block 130 provided at the upper end of the game interface, the corresponding English word block 130 may be removed.

However, in a case where the selection input for the English word block 130 that does not correspond to the Korean meaning of the English word block 130 provided at the upper end of the game interface is received, the English word block 130 corresponding to the Korean meaning is additionally generated, thereby being accumulated at the top of the currently provided English word blocks 130.

Meanwhile, as an additional embodiment, an incomplete English sentence including blanks in the game interface may be additionally provided. In this case, upon receiving the selection input of the user for the English word block 130 corresponding to the Korean meaning among a plurality of English word blocks configured at the lower end of the screen, the selected English word block 130 is removed and a completed sentence in which the selected English word is filled in the blanks may be additionally provided to the user. Therefore, the user may learn about the correct usage of the corresponding English word in the sentence.

In addition, the game interface of the game-based method for developing an English vocabulary learning application according to an embodiment of the present disclosure may be provided by including a special function button 140 that provides a special function in order to facilitate the progress of the game.

In this case, the special function may provide an effect of emphasizing the English word block 130 corresponding to a transliteration displayed in a transliteration display area of a specific English word, or filtering so as to display only a partial number of English word blocks 130 including the English word block 130 corresponding to the suggested Hangul meaning among the plurality of English word blocks 130.

In addition, a special function having an effect of removing the arbitrary English word block 130 may exist, and a special function having an effect of removing all of a specific color (same English word) may exist.

In addition, according to an embodiment of the present disclosure, limited to the third stage of the game interface, a special function for increasing the time limit may be provided.

The special function button 140 may exist in the game interface, and different special functions may be provided according to characteristics of each stage, and in a case of a specific stage, the special function button 140 may not be provided.

As illustrated in FIG. 3, in the first stage 210 of the game interface of the game-based method for developing an English vocabulary learning application according to an embodiment of the present disclosure, a plurality of the same English word block 130 may be provided so as to be repeatedly performed for words that may be learned at the corresponding level 110. Only the English words provided through the interface that provides spelling, Hangul meaning, and pronunciation for some of the English words to be learned at a specific level may be provided so as to repeatedly learn.

Figure 4:
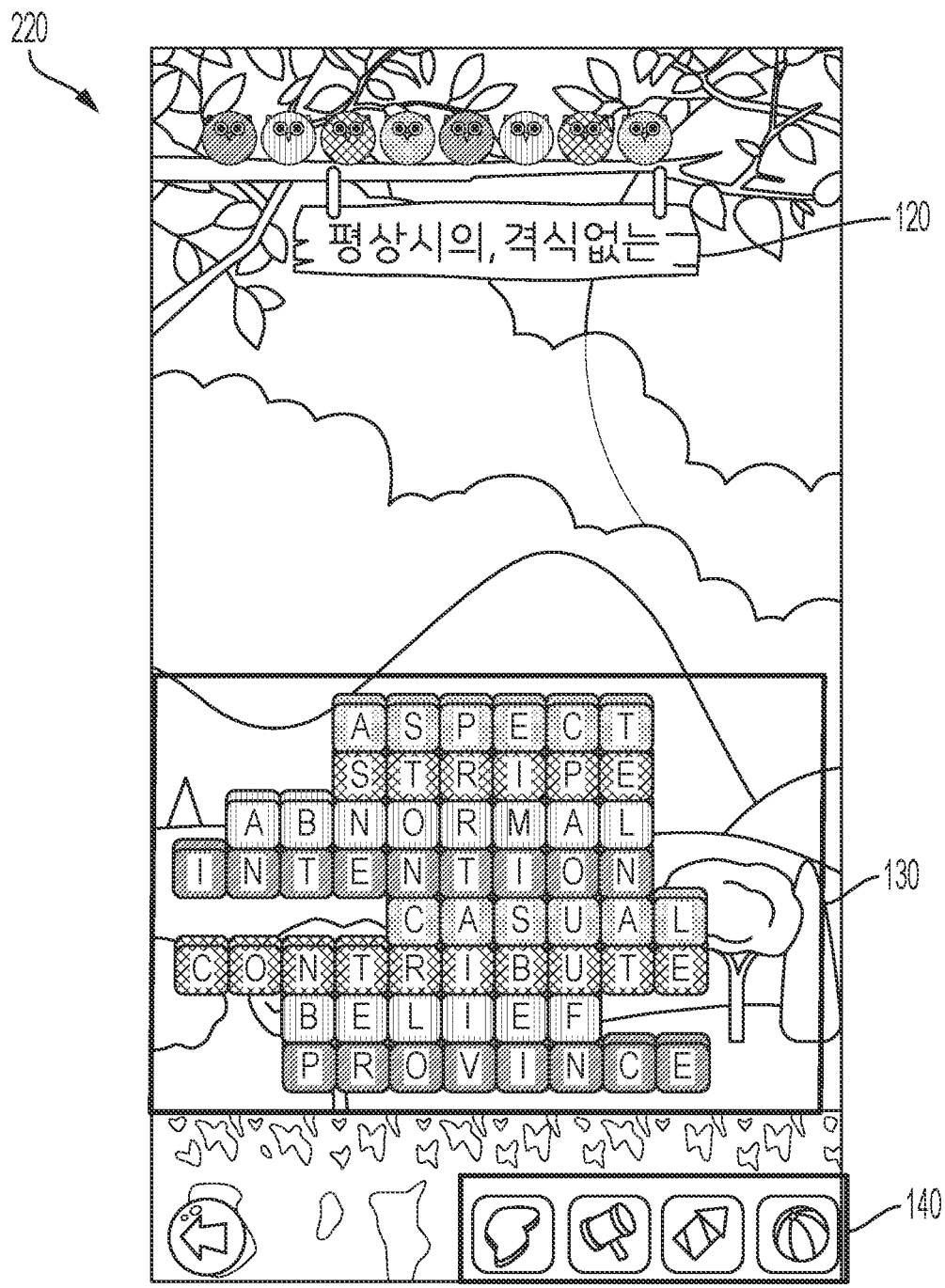
FIG. 4 is an exemplary view of a second stage of a game interface of a game-based method for developing a foreign language vocabulary learning application according to an embodiment of the present disclosure.

FIG. 4 is an exemplary view of the second stage 220 of a game interface of a game-based method for developing an English vocabulary learning application according to an embodiment of the present disclosure.

In the second stage 220 of the game interface of the game-based English learning application providing method according to an embodiment of the present disclosure, in addition to the English word block 130 provided in the first stage 210, additional English word blocks 130 may provide In this case, the additional English word block 130 may be the English word block 130 provided at the previous level 110.

As an additional embodiment of the present disclosure, in a case where one or more English words are input through an English wordbook application linked to the game-based English learning application (application linked to the app or linked through another separate app), one or more English words may be included in the English word block 130.

The English wordbook application is an application that may be used in the same form as a general wordbook by inputting a word that the user needs to learn directly, and may be an application capable of linking with the game-based English learning application according to an embodiment of the present disclosure.

That is, in a case where the user uses the English wordbook application linked to the game-based English learning application, the English words directly input by the user may be provided in the English word block 130 in the second stage 220 of the game interface of the game-based method for developing an English vocabulary learning application providing method according to an embodiment of the present disclosure.

In this case, the English wordbook application may be able to provide the user with all the words the user encounters through an embodiment of the present disclosure, and in a case where the game-based English learning application is executed, new words, words to be reviewed, and the like may be extracted to be provided.

In addition, the English wordbook application may be shared with other users. In a case of sharing with other users, in the second stage 220 of the game interface of the game-based method for developing an English vocabulary learning application according to an embodiment of the present disclosure, the words uploaded from the English wordbook application of other users may be provided in the English word block 130. For example, among the words shared by other users, new words and almost memorized words may be provided in the first step, new words or words to be reviewed may be provided in the second step, and random new words are may be provided in the third step. This is only an example, and is not necessarily limited to the embodiment.

For example, in a case where the user clicks (selects and inputs) a button or function linked to the English wordbook application on the My Page of the game-based English learning application, the wordbooks of the English wordbook application and the words on the English learning application may be randomly combined for each stage to be performed by the user.

Additionally, based on the folder sorted in the English wordbook application, or depending on whether it is a standard English word according to the level (for example, Elementary, middle, high school, or the like) of the user, and depending on whether it is an English word that the user has already memorized, You may divide the level of words may be divided and higher-level English words may be present as the stage goes up.

As an additional embodiment of the present disclosure, in the second stage 220 of the game interface of the game-based method for developing an English vocabulary learning application, based on the level 110 of the game the user is currently progressing, the same English words among other users, or English words provided to other users within the range of +2 to −2 level 110 with respect to the level 110 currently being performed by the user may be provided in the English word block 130.

For example, in a case where the user progresses the game at the 13th level 110 and enters the second stage 220, among other users, 11th level 110 to 15th level 110 is regarded as a level similar to that of other users, any one or more English words among the English words provided to other users may be provided to the user progressing the second stage 220 of the 13th level 110 in the English word block 130.

In addition, as an additional embodiment of the present disclosure, in the game-based method for developing an English vocabulary learning application, a separate competition level may exist, in which a specific user group or a plurality of users may progress the competition game using a set of words directly registered through the English wordbook application, and a ranking may be provided according to the contents of the game progressed at the competition level.

Figure 5:
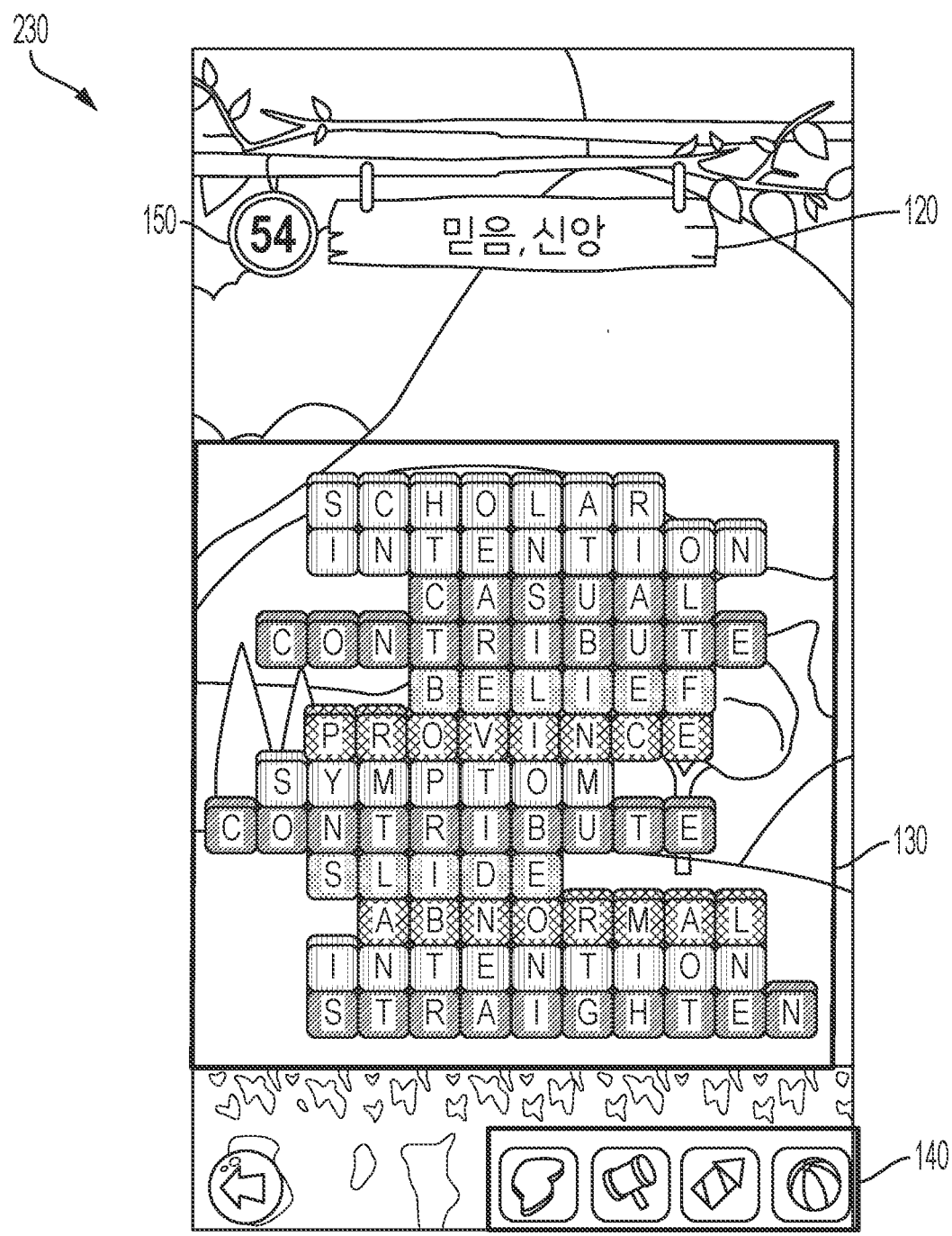
FIG. 5 is an exemplary view of a third stage of a game interface of a game-based method for developing a foreign language vocabulary learning application according to an embodiment of the present disclosure.

FIG. 5 is an exemplary view of the third stage 230 of a game interface of a game-based method for developing an English vocabulary learning application according to an embodiment of the present disclosure.

According to an embodiment of the present disclosure, in the third stage 230 of the game interface of the game-based method for developing an English vocabulary learning application, the English word block 130 provided in the first stage 210 and the second stage 220 may be provided, and even if not provided at the corresponding level 110, English words or random English words of the completed level 110 may be provided in the English word block 130.

Unlike the first stage 210 and the second stage 220, the third stage 230 of the game interface of the game-based method for developing an English vocabulary learning application according to an embodiment of the present disclosure may have a time limit, and may be configured to include the timer 150 in the game interface.

Similar to the method for the first stage 210 and the second stage 220, when the selection input for the English word block 130 corresponding to the Korean meaning 120 displayed at the upper end of the game interface is received, the method for progressing the game progresses in a method for removing the corresponding English word block 130, and the progressing has to be completed when the game is performed within the time limit.

The time limit may be applied differently for each level 110.

In addition, each stage that is sequentially progressed may be configured to include the number of English word blocks 130 larger than that of the previous stage.

Hereinafter, according to an embodiment of the present disclosure, an effect provided in a case where an incorrect answer is selected in each stage will be described in detail with reference to FIG. 6.

Figure 6:
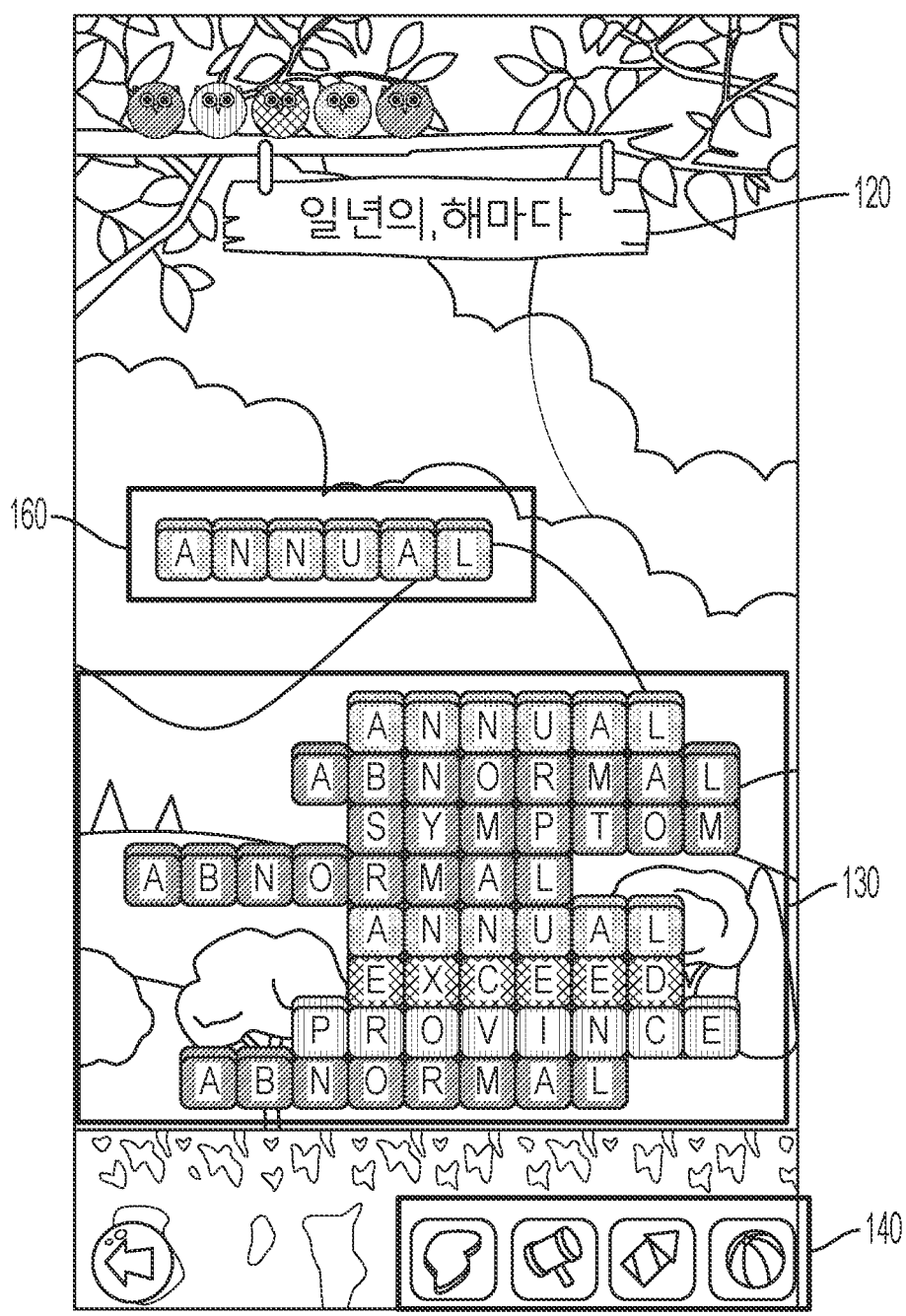
FIG. 6 is an exemplary view illustrating an effect provided when an incorrect answer is provided in a game-based method for developing a foreign language vocabulary learning application according to an embodiment of the present disclosure.

Referring to FIG. 6, the Korean meaning of 'annual, yearly' is displayed in the Korean meaning 120, and in order to progress with the game, the selection input has to be performed for a block corresponding to the Korean meaning in the English word block 130.

At this time, although the English word corresponding to the Korean meaning is 'ANNUAL', in a case where a block other than the corresponding English word block is selected, it is regarded as an incorrect answer, and the effect illustrated in FIG. 6 may be provided.

In a case where a block other than 'ANNUAL' is selected and input, an additional block 160 may be generated to inform the English word corresponding to the Korean meaning 120, and in this case, the generated additional block 160 may be a block corresponding to the Hangul meaning 120 that is currently displayed.

As illustrated in FIG. 6, in a case where the Hangul meaning 120 is "annual, yearly', the additional block 160 may be 'ANNUAL'.

When the selection input for the incorrect answer is performed, the additional block 160 is generated at the top of the interface, and may be added by being stacked on the top of the previously disposed English word block 130.

That is, in the case of selecting the incorrect answer (wrong word), the user is provided with what an English word is the English word corresponding to the Korean meaning displayed in the current Korean meaning 120, and at the same time, by repeating, selecting, and checking the corresponding word once again, it is possible to maximize the learning effect of the user.

Hereinafter, the game-based method for developing an English vocabulary learning application according to an embodiment of the present disclosure will be described in detail with reference to FIG. 7.

According to an embodiment of the present disclosure, the game-based method for developing an English vocabulary learning application performed by a terminal provides a selection interface 100 for level selection, and may receive an input for a specific level selection from the user (S610).

Before step S610, the English wordbook application linked to the English learning application or included in the English learning application may be pre-stored in the terminal, and in a case where one or more English words are input through the English wordbook application, one or more English words may be included in the English word block 130 provided in the game interface.

In this case, the English wordbook may be a separate application or may be included in the game-based English learning application according to an embodiment of the present disclosure.

In this case, the one or more English words may be English words directly input by the user and received, or may be English words uploaded by other users.

In addition, even if the English words which are provided to be included in the English word block 130 are removed according to the selection input of the user while progressing with the game, when the game is progressed for another level of the English learning application, the English words may be repeatedly present at every cycle which is preset according to an Ebbinghaus forgetting curve.

Here, the Ebbinghaus forgetting curve is a graph of general forgetting trends that appear over time, which is suggested by H. Ebbinghaus who studied memory or forgetting in the late 19th century, and since the curve is publicly known, a detailed description will be omitted.

In addition, before step S610, according to an embodiment of the present disclosure, in a case where the first execution of the game-based English learning application is performed by the terminal, it is possible to provide an interface for receiving an input for the English ability of the user.

For example, an interface may be provided in which a current age and a grade (for example, 4th grade in elementary school, 2nd grade in middle school, 3rd grade in high school, or the like) are input, information on the current age and the grade is received, and then the selection input for the English ability is performed.

According to the selection of the user, the English ability of the user may be determined and words corresponding thereto may be provided.

In addition, as an additional embodiment of the present disclosure, in the course of a user progressing a game through a game-based English learning application, a message may be provided, which provides a question as to whether an English word currently provided at a preset cycle corresponds to the English ability of the user.

In this case, the message may be provided in a pop-up form, and it is possible to adjust the difficulty of the provided English word according to the selection input of the user.

In addition, in a case where the user desires to adjust the difficulty, it is possible to directly adjust the difficulty.

Thereafter, the terminal may provide spelling, Hangul meaning, and pronunciation for some of the English words to be learned at a specific level based on the input of the user (S620).

The English words may be provided to the user through the interface that provides spelling, Hangul meaning, and pronunciation for some of the English words to be learned at a specific level. When the selection input for the provided English words is received, the pronunciation of the corresponding word may be provided.

After receiving the selection input for the provided English word, the game interface including the display area of the Korean meaning of a specific English word at the upper end of the screen and a display area of the English word block 130 of a plurality of different spellings at the lower end of the screen of the terminal may be provided (S630).

In the game interface, in a case of receiving the selection input for any one English word block among a plurality of English word blocks 130 (S640), after it is determined that whether the English word block 130 corresponding to the selection input matches the Korean meaning of the presented English word (S650), if they are matched, the English word block 130 that has been selected and input may be removed (S660).

In a case where all of the plurality of English word blocks 130 are removed, the game progress of a specific level may be completed.

At this time, in a case where the English word block 130 corresponding to the selection input does not match the Korean meaning 120 of the presented English word, identification information indicating that the English word does not match the Korean meaning 120 thereof is provided, and the additional English word block 130 may be generated (S670).

Here, the generated additional English word block 130 may be the English word block 130 that matches the Korean meaning of the presented English word.

Here, the identification information may be provided as any one or more of a predetermined sound and a predetermined video.

In steps S610 to S640, the selection input includes any one of a direct input, a drag input, a click input, and a touch input, and in a case of the drag input, when the drag input is received for a preset range or more with respect to the English word block 130, the drag input may be received as a normal selection input.

In addition, the English word block is configured of one block for each alphabet, and when the drag input is received from the left to the right of the English word block 130, it may be considered that the selection input has been received, even if the drag input is received from a block located in a predetermined order rather than the first block from the left.

In a case of the drag input, in a case where the size of the word block provided in the game-based English learning application according to an embodiment of the present disclosure is small compared to the size of the hand of the user, there may be a difference from the area where the actual drag input is performed.

This may be generated due to a difference in the field of view of the user, and accordingly, an area in which the drag input may be performed and a position of a graphic shown to the user may be different.

Specifically, a drag recognizable area may be located below the area in which the English word block is displayed by ⅓ of the block size. Alternatively, in a case of the English block which is the correct answer, the drag recognizable area may be located at a point lower than the area in which the English word block is displayed by half the size of the English word block so as to be easily selected.

As a result, user convenience may be promoted, and selection of the block of the correct answer may be facilitated.

Each level 110 of the game-based English learning application may be configured of one or more stages that are sequentially progressed.

Here, each stage may include a first stage configured of one or more English word blocks 130 including the English words presented in step S620, a second stage configured of one or more English word blocks 130 included in the first stage and the additional English word block 130, and a third stage which is provided with the English word block 130 included in the second stage and in which a time limit is set.

In addition, in step S630, a special function button that may be used in the game may be provided at the lower end of the display area of the English word block 130 in the game interface. the special function may provide the effect of emphasizing English word blocks 130 corresponding to transliteration displayed on a transliteration display area of the specific English word, or filtering to display only some number of English word blocks 130 including English word block 130 corresponding to the presented Hangul meaning among the plurality of English word blocks 130.

In addition, after the step S640, in addition to the English word removed in the step S640, the Korean meaning of any one of the remaining English word blocks 130 that are not removed may be presented at the upper end of the screen.

At this time, it is possible to preferentially present the Korean meaning of the English word different from the removed English word.

In this specification, in order to explain an embodiment of the present disclosure, a game method for learning by matching the Korean meaning with the English word has been described, but this is only an embodiment and is not limited thereto.

For example, the game method is not limited to the language of a specific country such as a Chinese word—Korean meaning, a Japanese word—English meaning, or a Korean word—English meaning, and languages for words and meanings may also be cross-learned.

An embodiment of the present disclosure may also be implemented in a form of a recording medium including instructions executable by a computer, such as a program module executed by a computer. Computer-readable media may be any available media that may be accessed by a computer and includes all volatile and non-volatile media, removable and non-removable media. In addition, the computer-readable media may include all computer storage media. The computer storage media includes all volatile and nonvolatile, removable and non-removable media implemented in any method or technology for storage of information such as computer readable instructions, data structures, program modules, or other data.

Although the methods and systems of the present disclosure have been described with reference to specific embodiments, some or all of their configuration elements or operations may be implemented by using a computer system having a general purpose hardware architecture.

The above description of the present disclosure is for illustration, and those of ordinary skill in the art to which the present disclosure pertains may understand that it may be easily modified into other specific forms without changing the technical spirit or essential features of the present disclosure. Therefore, it should be understood that the embodiments described above are illustrative in all respects and not restrictive. For example, each configuration element described as a single type may be implemented in a dispersed form, and likewise configuration elements described as distributed may also be implemented in a combined form.

The scope of the present disclosure is indicated by the following claims rather than the above detailed description, and all changes or modifications derived from the meaning and scope of the claims and their equivalent concepts should be interpreted as being included in the scope of the present disclosure.

What is claimed is:

1. A game-based method for developing a foreign language vocabulary learning application performed by a terminal, comprising:
   (a) a step of providing a game interface including a display area for a meaning of a word in a preset language in one area of a screen, and a display area for a plurality of foreign language words having different spellings in another area of the screen of the terminal; and
   (b) a step of determining whether a foreign language word corresponding to a selection input is a correct word matching the meaning of the word in the preset language, and then when they are matched, removing the foreign language word of the selection input, when the selection input for any one foreign language word among the plurality of foreign language words is received,
   wherein the step (b) further comprising:
   a step of providing identification information indicating that they do not match when the foreign language word corresponding to the selection input does not match meaning of the word in the preset language, and additionally generating a foreign language word block corresponding to the correct word,
   wherein when all or a specified number of the plurality of foreign language words are removed, progress of the game is completed,
   wherein the step (a) further comprising:
   a step of displaying a plurality of English word blocks corresponding to the foreign language words on the screen of the terminal, the plurality of English word blocks being stacked randomly;
   a step of providing spelling, meaning, and pronunciation for some of the foreign language words to be learned, providing a Korean meaning block of an English word block and an English word block provided at a current level, and providing a pronunciation of an English word as a sound when the English word block is configured of a plurality of blocks in which each spelling constituting the corresponding word is configured of one block, and the selection input is performed for the English word block,
   wherein the step (b) is provided on a screen different from that of the step (a),
   wherein after the step (b), further comprising:
   a step of setting a time limit in the game interface when a specific level is reached, sharing at least one or more words registered by a specific user group and at least one or more user through an English wordbook application linked to the foreign language vocabulary learning application to perform the progress of the game, and providing a ranking according to contents of the progress of the game,
   wherein the selection input includes a drag input, and
   wherein a drag recognizable area in which the drag input is performed is located below an area in which corresponding English word block is displayed by one third of a size of the English word block.

2. The game-based method for developing a foreign language vocabulary learning application according to claim 1,
   wherein the preset language is any one of a preset language provided by an application, a language designated as a default value in the terminal of the user, and a language set through a direct input of the user.

3. The game-based method for developing a foreign language vocabulary learning application according to claim 1,
   wherein the identification information is any one or more of a predetermined sound and a predetermined video.

4. The game-based method for developing a foreign language vocabulary learning application according to claim 1, further comprising:
   (c) a step of presenting meaning of any one of remaining foreign language words that have not been removed other than the foreign language words removed in step (b) at an upper end of the screen.

5. The game-based method for developing a foreign language vocabulary learning application according to claim 4,
   wherein in step (c), meaning of a foreign language word different from the foreign language word removed in step (b) is initially presented.

6. The game-based method for developing a foreign language vocabulary learning application according to claim 1,
   when the drag input for a preset range or more is received for the foreign language word, the drag input is received as a normal selection input.

7. The game-based method for developing a foreign language vocabulary learning application according to claim 6,
   wherein the foreign language word is configured of one block for each letter, and when the drag input is received from the left to the right of the foreign language word, the selection input is considered to be received even if the drag input is received from a block located in a predetermined order rather than a first block from the left.

8. The game-based method for developing a foreign language vocabulary learning application according to claim 1, before step (a), further comprising:
   (a-1) a step of including the one or more foreign language words included in a foreign language wordbook application in the foreign language words of the foreign language vocabulary learning application when one or more foreign language words are input through the foreign language wordbook application linked to the foreign language vocabulary learning application.

9. The game-based method for developing a foreign language vocabulary learning application according to claim 8,
wherein in the step (a-1), one or more foreign language words included in the foreign language wordbook application is a foreign language word which is received by direct input of the user, or a foreign language word which is uploaded by another user.

10. The game-based method for developing a foreign language vocabulary learning application according to claim 8,
wherein the one or more foreign language words are repeatedly presented every preset cycle according to an Ebbinghaus forgetting curve when the game is progressed for another level of the foreign language vocabulary learning application even if the one or more foreign language words are removed according to the selection input.

11. The game-based method for developing a foreign language vocabulary learning application according to claim 1,
wherein the specific level is configured of one or more stages that sequentially progress.

12. The game-based method for developing a foreign language vocabulary learning application according to claim 1,
wherein the step (a) further comprising:
a step of providing a special function button capable of being used in the game at a lower end of the display area of the foreign language word in the game interface,
wherein the special function provides an effect of emphasizing the foreign language word corresponding to transliteration displayed in a transliteration display area of specific foreign language words or filtering to display only some number of foreign language words including a foreign language word corresponding to the presented meaning among the plurality of foreign language words.

13. A server providing a game-based method for developing a foreign language vocabulary learning application, comprising:
a memory in which a game-based foreign language learning application program is stored; and
a processor for executing the program,
wherein according to the execution of the program, the processor provides the method including:
(a) a step of providing a game interface including a display area for a meaning of a word in a preset language in one area of a screen, and a display area for a plurality of foreign language words having different spellings in another area of the screen of a terminal; and
(b) a step of determining whether a foreign language word corresponding to a selection input is a correct word matching the meaning of the word in the preset language, and then when they are matched, removing the foreign language word of the selection input, when the selection input for any one foreign language word among the plurality of foreign language words is received,
wherein the step (b) further including:
a step of providing identification information indicating that they do not match when the foreign language word corresponding to the selection input does not match meaning of the word in the preset language, and additionally generating a foreign language word block corresponding to the correct word,
wherein when all or a specified number of the plurality of foreign language words are removed, progress of the game is completed,
wherein the step (a) further including:
a step of displaying a plurality of English word blocks corresponding to the foreign language words on the screen of the terminal, the plurality of English word blocks being stacked randomly;
a step of providing spelling, meaning, and pronunciation for some of the foreign language words to be learned, providing a Korean meaning block of an English word block and an English word block provided at a current level, and providing a pronunciation of an English word as a sound when the English word block is configured of a plurality of blocks in which each spelling constituting the corresponding word is configured of one block, and the selection input is performed for the English word block,
wherein the step (b) is provided on a screen different from that of the step (a), and
wherein after the step (b), further including:
a step of setting a time limit in the game interface when a specific level is reached, sharing at least one or more words registered by a specific user group and at least one or more user through an English wordbook application linked to the foreign language vocabulary learning application to perform the progress of the game, and providing a ranking according to contents of the progress of the game,
wherein the selection input includes a drag input, and
wherein a drag recognizable area in which the drag input is performed is located below an area in which corresponding English word block is displayed by one third of a size of the English word block.

* * * * *